United States Patent [19]
Tichborne et al.

[11] Patent Number: 5,396,428
[45] Date of Patent: Mar. 7, 1995

[54] MULTI-FUNCTION APPLICATION SPECIFIC INTEGRATED CIRCUIT FOR CONTROLLING SPACECRAFT THRUSTERS

[75] Inventors: Franklin G. Tichborne; John S. Stevens, both of Bristol, United Kingdom

[73] Assignee: British Aerospace Space and Communications Limited, Hertfordshire, England

[21] Appl. No.: 925,276

[22] Filed: Aug. 6, 1992

[30] Foreign Application Priority Data

Aug. 8, 1991 [GB] United Kingdom ............. 9117187

[51] Int. Cl.6 ............ G06F 15/50; B64G 1/24; H04B 7/185
[52] U.S. Cl. ................... 364/434; 364/459; 340/870.07; 342/355
[58] Field of Search .................. 364/459, 434; 340/870.07; 342/355; 395/250; 244/164, 169, 172

[56] References Cited

U.S. PATENT DOCUMENTS

| | | | |
|---|---|---|---|
| 3,763,472 | 10/1973 | Sharp | 395/250 |
| 3,975,712 | 8/1976 | Hepworth et al. | 371/49.1 |
| 4,426,685 | 1/1984 | Lorentzen | 364/900 |
| 4,855,735 | 8/1989 | Webb et al. | 340/870.14 |
| 5,070,338 | 12/1991 | Cohen | 342/355 |

FOREIGN PATENT DOCUMENTS 1507761 4/1978 United Kingdom.
2097564 11/1982 United Kingdom.

*Primary Examiner*—Michael Zanelli
*Attorney, Agent, or Firm*—Cushman, Darby & Cushman

[57] ABSTRACT

A multifunctional application specific integrated circuit (ASIC) may be configured to perform one of three different functions by selecting the input status of particular pins on the ASIC. The pins serve various functions according to the set operational mode of the ASIC. The three modes described are a thruster drive mode, a microprocessor interface drive and a bypass mode.

4 Claims, 13 Drawing Sheets

FIG. 3a

WORD X_1

| MSB 0 | 1-5 | 6-15 |
|---|---|---|
| always = 0 | word X address<br>0 – 31 | Phase Angle<br>range = 0 to 359.65°<br>increments = 0.35°<br>accuracy = ±0.4° |

FIG. 3b

WORD X_2

| MSB 0 | 1-9 | 10-12 | 13 | 14 | 15 |
|---|---|---|---|---|---|
| always = 1 | Thruster Duration<br>range = 0 to 179.65°<br>increments = 0.35°<br>accuracy = ±0.4° | frequency 0 - 7<br>0 = 1 pulse/spin<br>to<br>7 = 8 pulses/spin | spare<br>command<br>output<br>M_29_OUT | select<br>Thruster<br>#A | select<br>Thruster<br>#B |

FIG. 3c

WORD Y_1

| MSB 0 | 1-5 | 6-15 |
|---|---|---|
| always = 0 | word Y address<br>0 – 31 | Control Output bits<br>L_6_OUT to L_15_OUT |

FIG. 3d

WORD Y_2

| MSB 0 | 1-13 | 14 | 15 |
|---|---|---|---|
| always = 1 | Timer initialize<br>in pulse mode = 0 – 8191<br>in continuous mode = 0 – 2.28 hours in 1 second increments | mode;<br>pulsed = 0<br>Continuous = 1 | Control<br>output<br>L_31_OUT |

FIG. 3e

WORD X_1

| MSB 0 | 1-5 | 6-15 |
|---|---|---|
| always = 0 | word X address reflected<br>0 – 31 | Phase Angle reflected<br>range = 0 to 359.65°<br>increments = 0.35° |

FIG. 3f

WORD X_2

| MSB 0 | 1-9 | 10-12 | 13 | 14 | 15 |
|---|---|---|---|---|---|
| always = 1 | Thruster Duration reflected<br>range = 0 to 179.65°<br>increments = 0.35° | frequency 0 - 7<br>reflected<br>0 = 1 pulse/spin to<br>7 = 8 pulses/spin | spare<br>telemetry<br>input<br>M_29_IN | Thruster<br>#A<br>selected | Thruster<br>#B<br>selected |

FIG. 3g

WORD Y_1

| MSB 0 | 1-5 | 6-15 |
|---|---|---|
| always = 0 | word Y address reflected<br>0 – 31 | Telemetry input bits<br>HK_6_IN_ to HK_15_IN |

FIG. 3h

WORD Y_2

| MSB 0 | 1-13 | 14 | 15 |
|---|---|---|---|
| always = 1 | Timer Elapsed (counts down from initialized value)<br>in pulse mode from 0 – 8191 to 0<br>in continuous mode from 0 – 2.28 hours in 1 second increments to 0 | mode<br>reflected;<br>pulsed = 0<br>Continuous = 1 | Telemetry<br>input<br>HK_31_IN |

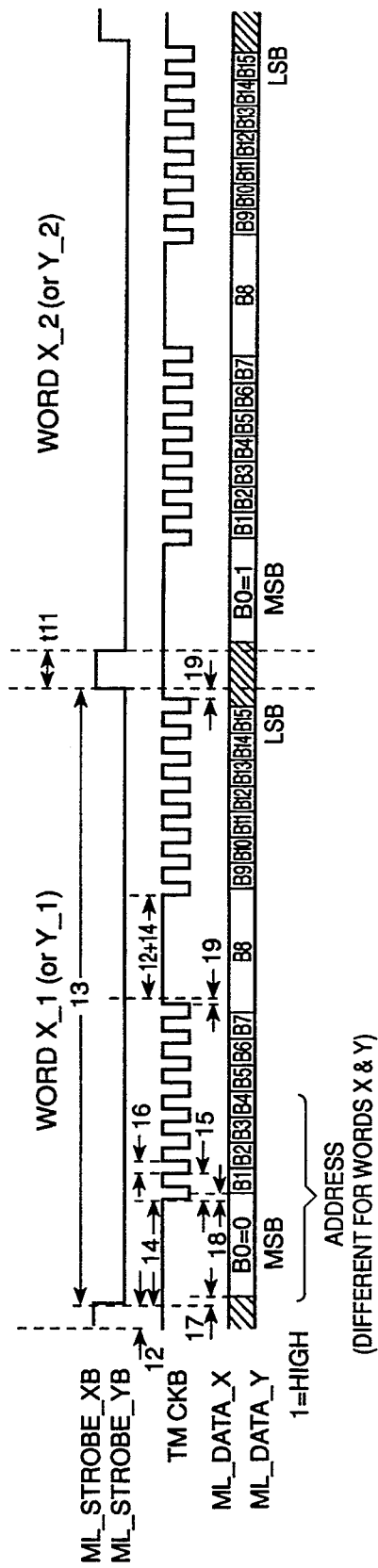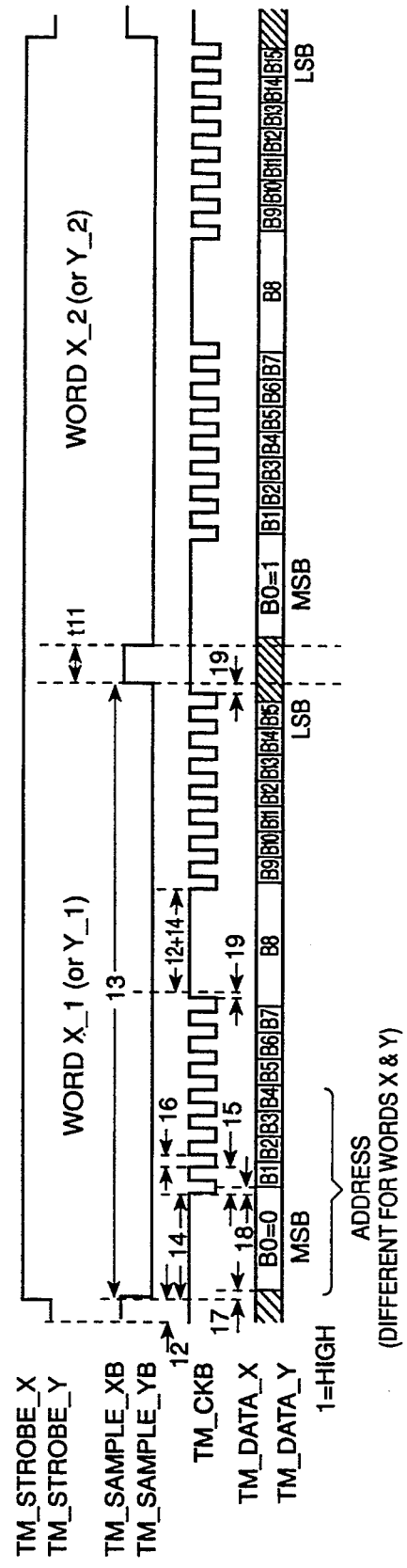

| | factor | min | max |
|---|---|---|---|
| t1 | byte period | 8 x t5 | |
| t2 | strobe inactive | t6 | |
| t3 | strobe active | 16 x t5 | |
| t4 | strobe to clock | 25 nS | |
| t5 | clock period | 2 x t6 ± 10% | |
| t6 | mark or space period | 500nS | |
| t4-t7 | data set up time (BO) | 25nS | |
| t5-t8 | data set up time | 25nS | |
| t8 | data hold time | 10nS | |
| t9 | clock to strobe hold | 10nS | |
| t11 | inter-word null time | 50nS | |

*Fig. 4c*

| | factor | min | max |
|---|---|---|---|
| t1 | byte period | 8 x t5 | |
| t2 | strobe inactive | t6 | |
| t3 | strobe active | 16 x t5 | |
| t4 | strobe to clock | 25nS | |
| t5 | clock period | 2 x t6 ± 10% | |
| t6 | mark or space period | 500nS | |
| t7 | data response time (BO) | | 30nS |
| t8 | data response time | | 50nS |
| t9 | clock to strobe hold | 10nS | |
| t11 | inter-word null time | 50nS | |

|  | Chip Select⁻ | AD15 | R/W⁻ |
|---|---|---|---|
| Chip not addressed | H | x | x |
| Read Status | L | 1 | H |
| Write to Control Register | L | 1 | L |
| Read Command I/P Data (16 bits) | L | 0 | H |
| Write Telemetry O/P Data (16 bits) | L | 0 | L |

FIG. 7a

| MSB 0 | 1 | 2 | 3 | 4 to 15 |
|---|---|---|---|---|
| Enable Telemetry Interrupt | Enable Telecommand Interrupt | Clear Telemetry complete and interrupt | Clear Telecommand complete and interrupt | not used |

FIG. 7b

| MSB 0 | 1 | 2 | 3 | 4 | 5 | 6 to 15 |
|---|---|---|---|---|---|---|
| Telemetry Interrupt Enabled | Telecommand Interrupt Enabled | Telemetry cycle complete (ie Data taken) | Telecommand cycle complete (ie Data available) | Telemetry Sample | Telecommand Strobe | not used for status, same data as the Data port bits 6 to 15 |

FIG. 7c

TELEMETRY (write)

| MSB 0 | 1 | 2 | 3 | 4 | 5 | 6 | 7 | 8 | 9 | 10 | 11 | 12 | 13 | 14 | LSB 15 |
|---|---|---|---|---|---|---|---|---|---|---|---|---|---|---|---|

MSB transmitted first

FIG. 7d

TELECOMMAND (read)

| MSB 0 | 1 | 2 | 3 | 4 | 5 | 6 | 7 | 8 | 9 | 10 | 11 | 12 | 13 | 14 | LSB 15 |
|---|---|---|---|---|---|---|---|---|---|---|---|---|---|---|---|

MSB received first

|  | factor | min | max |
|---|---|---|---|
| t1 | byte period | 8 x t5 | |
| t2 | strobe inactive | t6 | |
| t3 | strobe active | 16 x t5 | |
| t4 | strobe to clock | 25nS | |
| t5 | clock period | 2 x t6 ± 10% | |
| t6 | mark or space period | 500 nS | |
| t4 - t7 | data setup time (B0) | 25 nS | |
| t5 - t8 | data set up time | 25 nS | |
| t8 | data hold time | 10 nS | |
| t9 | clock to strobe hold | 10 nS | |
| t10 | strobe to interrupt | | 30 nS |

*Fig. 8c*

|  | factor | min | max |
|---|---|---|---|
| t1 | byte period | 8 x t5 | |
| t2 | strobe inactive | t6 | |
| t3 | strobe active | 16 x t5 | |
| t4 | strobe to clock | 25 nS | |
| t5 | clock period | 2 x t6 ± 10% | |
| t6 | mark or space period | 500 nS | |
| t7 | data response time B0 | | 50 nS |
| t8 | data response time | | 50 nS |
| t9 | clock to strobe hold | 10 nS | |
| t10 | strobe to interrupt | | 30 nS |

*Fig. 8d*

MULTI-FUNCTION APPLICATION SPECIFIC INTEGRATED CIRCUIT FOR CONTROLLING SPACECRAFT THRUSTERS

BACKGROUND OF THE INVENTION

This invention relates to data processing apparatus for use on board a spacecraft and in particular, but not exclusively, to such apparatus implemented in Application Specific Integrated Circuits (ASICs).

Many of the functions on board a spacecraft are controlled remotely and require the exchange of control signals between the spacecraft and a remote control station. For example the jet thrusters on board the spacecraft used for station-keeping are typically controlled in accordance with telecommanded signals generated at the remote control station and, as part of the control loop, the spacecraft returns telemetry signals to the remote station. Spinning spacecraft often have multiple thrusters thus requiring several control circuits and these can be extravagant in terms both of payload weight and power consumption.

SUMMARY OF THE INVENTION

Accordingly, in one aspect of this invention we have designed an ASIC functioning as a spacecraft thruster drive controller. This provides significant reductions in payload and power consumption, and of the order of 25% in some cases.

Telecommand data to the spacecraft and telemetry data returned to the remote control station usually follow a serial data standard, a typical example being that set out in the European Space Agency (ESA) document TTC-B-01 Issue 1, which defines one AS16 telemetry channel and one CS16 command channel. The standard can readily be extended to 32 bits.

Given that there is a common serial data standard adopted for communication to and from the spacecraft, we have found that a circuit—typically an ASIC—designed to operate, say, as a thruster drive controller, can be made to operate as an interface allowing duplex transmission of serial data to and from a microprocessor or databus on board the spacecraft with only minor modification of the circuit. In other words, the thruster controller and the interface referred to above handle data in similar formats in use and have several if not most circuit elements in common. Thus, the high costs of developing an ASIC, say, to provide thrust drive control, can be significantly offset if the ASIC is modified to include some sort of function selection and, if necessary, further circuit elements appropriate to the further functions envisaged. The ability to provide such multi-function capability is dependent largely on the selection of the appropriate circuit elements for a particular function which preferably may be readily adapted to provide alternative functions.

Accordingly, in another aspect this invention provides an application specific integrated circuit (ASIC) for use on board a spin-stabilised spacecraft to function as a duplex serial interface to control and monitor the thrusters on the spacecraft, said application specific integrated circuit including serial-to-parallel converter means for converting serial telecommand data into parallel format, means for storing said converted telecommand data for subsequent control of thruster timing pulses, means for receiving and storing telemetry data from said thrusters, and parallel-to-serial converter means for converting said stored telemetry data into serial format for transmission.

DESCRIPTION OF THE DRAWINGS

The invention may be performed in various ways and, by way of example only, an embodiment thereof, comprising a multifunctional ASIC device will now be described in detail, reference being made to the accompanying drawings, in which:

FIGS. 3a-b illustrate the bit allocations of the command and telemetry words in the thruster drive mode;

FIG. 4a-d illustrate the timing diagrams for the thruster device mode;

FIG. 6 illustrates the microprocessor memory map in the microprocessor mode;

FIG. 7a-d illustrate the bit assignation of the control status and data ports in the microprocessor mode;

FIG. 8a-f illustrate the timing diagrams for the microprocessor mode,

DESCRIPTION OF THE PRESENTLY PREFERRED EXEMPLARY EMBODIMENT

The multifunctional ASIC device to be described is designed to perform three standard spacecraft functions, selected by setting the configuration of its pins. The device has 68 pins, and the configuration pin input status and pin listing for each mode are given in the appendix. The three functions are the thruster drive mode, microprocessor mode and bypass mode and will be described below.

Figure 1:
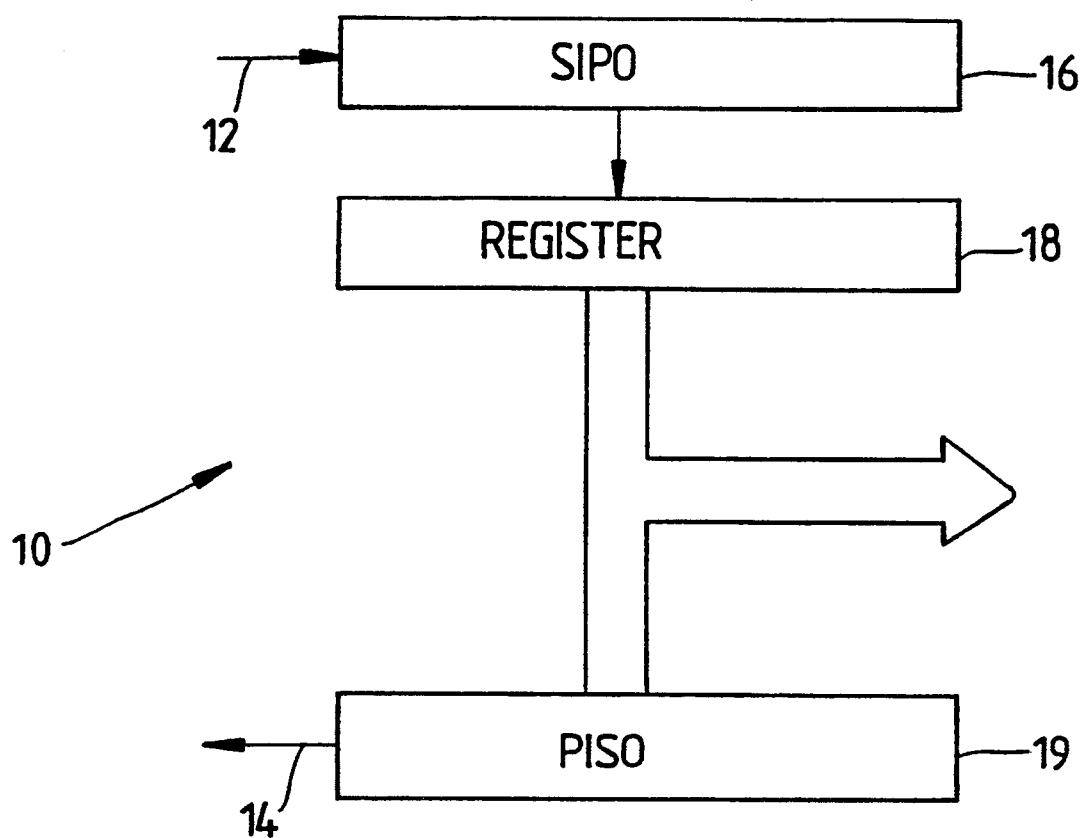
FIG. 1 is a schematic view illustrating the circuit elements of the multifunctional ASIC device which are shared between its three functions.

Referring to FIG. 1, the ASIC 10 has serial telecommand and telemetry ports 12,14 respectively for receiving ESA AS32/CS32 or AS16/CS16 type telemetry/control signals as previously identified. Data arriving at the telecommand port 12 is converted by a serial in parallel out (SIPO) converter 16 and supplied to a register 18. Telemetry Data is converted from parallel into serial format by a parallel in serial out (PISO) converter 19 and then supplied to the telemetry port 14.

THRUSTER DRIVE MODE

Figure 2:
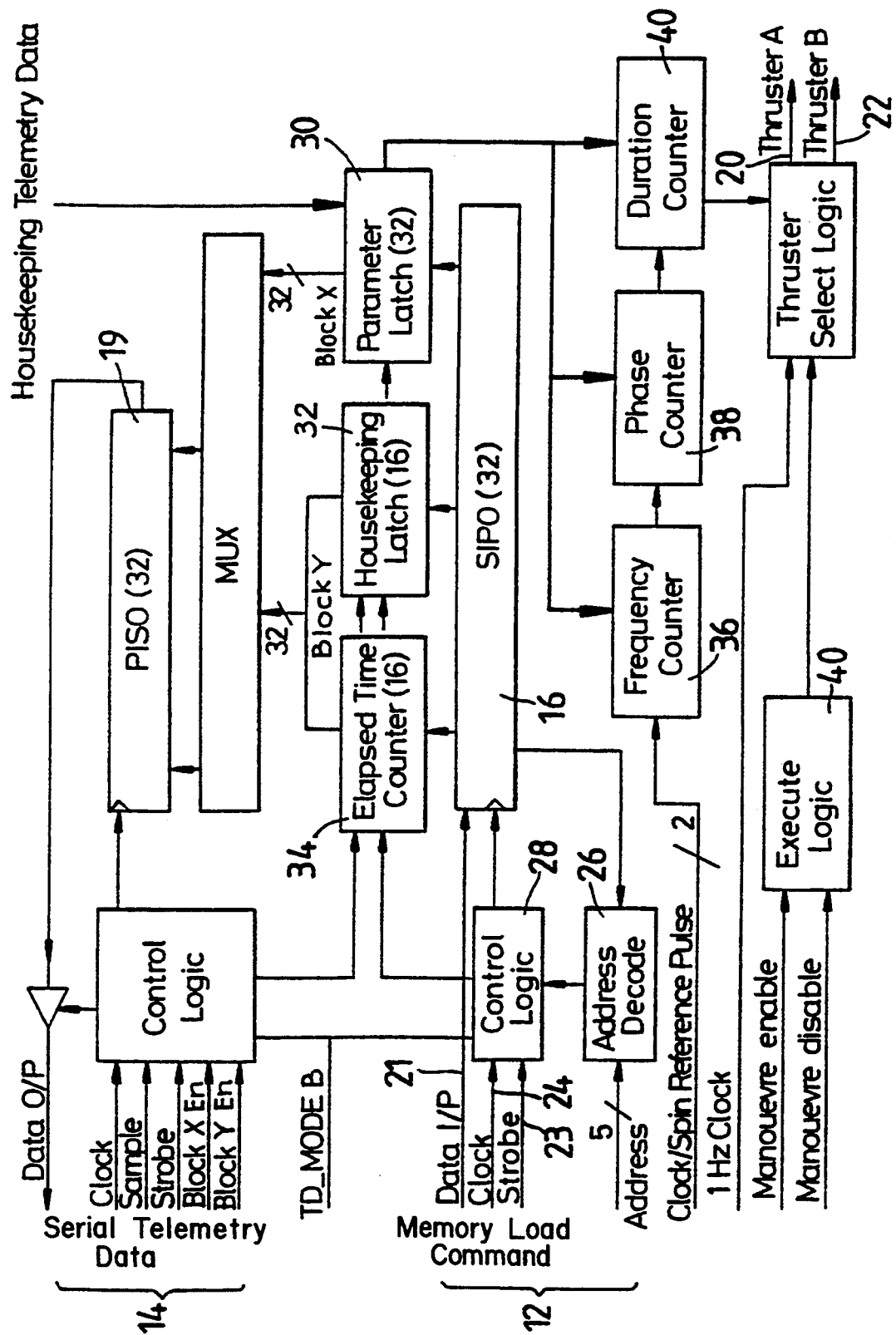
FIG. 2 is a block diagram representing the multifunctional ASIC device when operating in the thruster drive mode.

In the thruster drive mode, as shown in more detail in FIG. 2, the ASIC device 10 generates two thruster firing pulses on lines 20 and 22 with the following telecommanded parameters:

division repetition rate with reference to the spin reference pulses (i.e. frequency).

phase delay relative to individual spin reference pulses, and duration of thruster pulses.

Additional secondary control telecommanded parameters are:

elapsed time set chip address
individual pulse enables (A and B)
mode selections When used on spinning satellites with multiple thrusters, considerable savings on hardware can be achieved. The telecommand/telemetry standard in this mode is similar to the ESA Standard (TTC-B-01), extended to 32 bits and includes a second strobe to enable clusters of functions to be controlled. A link settable address enables up to 16 chips to be controlled from the same telecommand channel without additional logic. In the thruster drive mode the ASIC device is instructed via a 32 bit telecommand interface to generate a pair of thruster drive pulses related in frequency and phase to a spin reference pulse, and of specified duration. Each command consists of two 32 bit transmissions denoted words X and Y.

Referring to FIGS. 3a–h, each 32 bit word consists of two standard 16 bit CS16 transmissions, the bit allocations being as shown in the Figures. It will be seen that only the first CS16 of each pair contains the chip address and so the signals must always be supplied as pairs. The first CS16 has its most significant bit (MSB) set to '0' whilst the second has its MSB set to '1'. The chip address is 5 bits long and hence, with 2 addresses in each chip, 16 devices can be controlled from the same command channel.

The two 32 bit telemetry bits also denoted X and Y are generated to enable confirmation of the commanded status and to supply extra housekeeping data. The telemetry signals are read as two 32 bit words each consisting of 2 standard 16 bit AS16 transmissions. Since only the first AS16 contains the address the signals are always read as pairs. The first AS16 has its MSB set to '0' while the second sets its MSB to '1'. In order to facilitate the correct reading of telemetry two extra strobes are required which encompass each pair of AS16 words. The bit allocations are also given in these Figures.

The timing diagrams for the thruster drive mode for both telecommand (Memory Load Command) and Serial Telemetry are shown in FIG. 4a–d.

When both words X and Y have been correctly loaded, confirmable by telemetry, then the thruster sequence can be enabled (or disabled) by the manoeuvre enable (disable) signals following the next spin reference pulse. Either or both thruster pulses can be enabled by the X_2 command word.

An elapsed timer is maintained, initialised by word Y_2 command, decremented by the 1Hz clock when in continuous mode or by the generated thruster pulses when in pulsed mode. This timer is readable in the Y telemetry. Space command and housekeeping telemetry bits are brought out to pins on the device.

In the thruster drive mode, memory load command data is supplied in serial format to the 32 bit SIPO converter 16 on line 21 in accordance with strobe and clock signals on lines 23 and 24 respectively, as seen in the timing diagram in FIG. 4a. The 5-bit address code is checked by an address decoder 26 which supplies a signal to the telecommand control logic 28. Following conversion at the SIPO Converter 16, the X_1 and X_2 words are passed to a 32 bit parameter latch 30 and the Y_1 and Y_2 words are passed to a 16 bit housekeeping latch 32 and a 16 bit Elapsed Time Counter latch 34 respectively. The signal at the parameter latch 30 is then used to instruct a frequency counter 36, a phase counter 38 and a duration counter 40 which in turn supply control signals to the thruster select logic 42 which controls operation of two thrusters 'A' and 'B' by control lines 20 and 22 respectively. The thruster select logic is enabled by an execute logic circuit 44 dependent on manoeuvre enable and manoeuvre disable signals respectively. At the telemetry side, signals from the parameter, housekeeping and elapsed time counter latches 30, 32 and 34 are supplied to a multiplexer 46 thence to a 32 bit PISO converter 19. The serial telemetry data is then output for transmission.

Microprocessor Mode

For the microprocessor mode, the configuration pin input status is adjusted and the pins have the microprocessor mode input and output functions as shown in the pin listing in the appendix.

Figure 5:
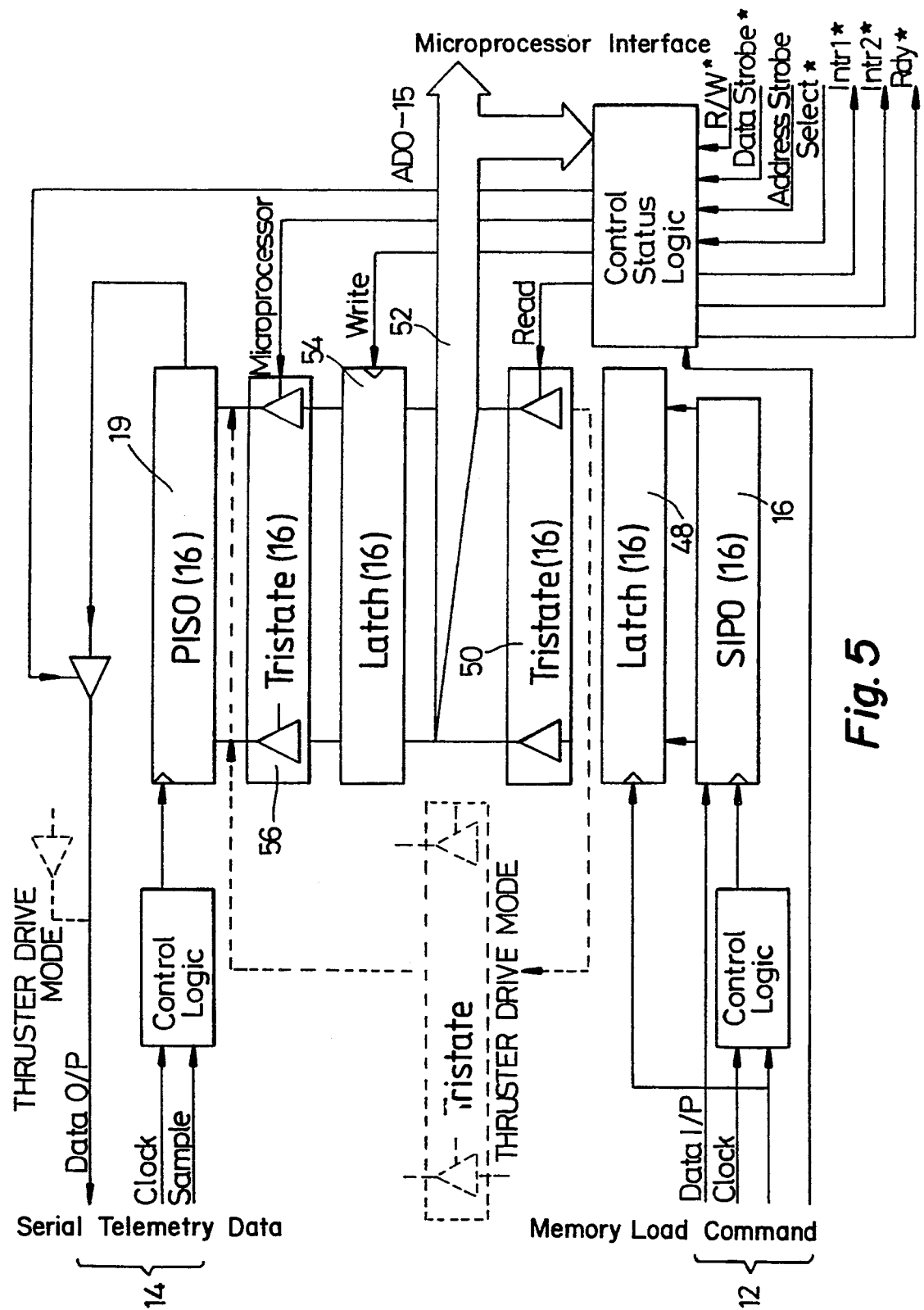
FIG. 5 is a block diagram representing the multifunctional ASIC device when operating in the microprocessor mode.
Figure 8A:
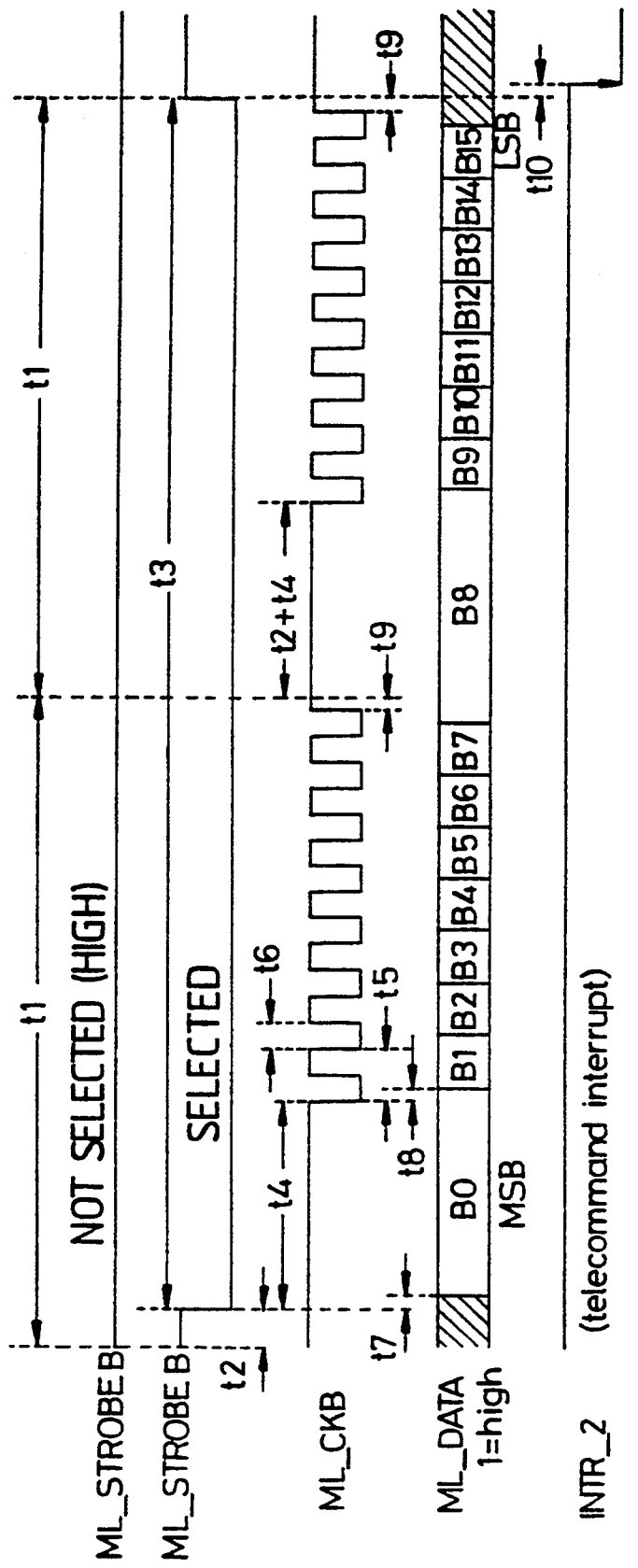
Figure 8B:
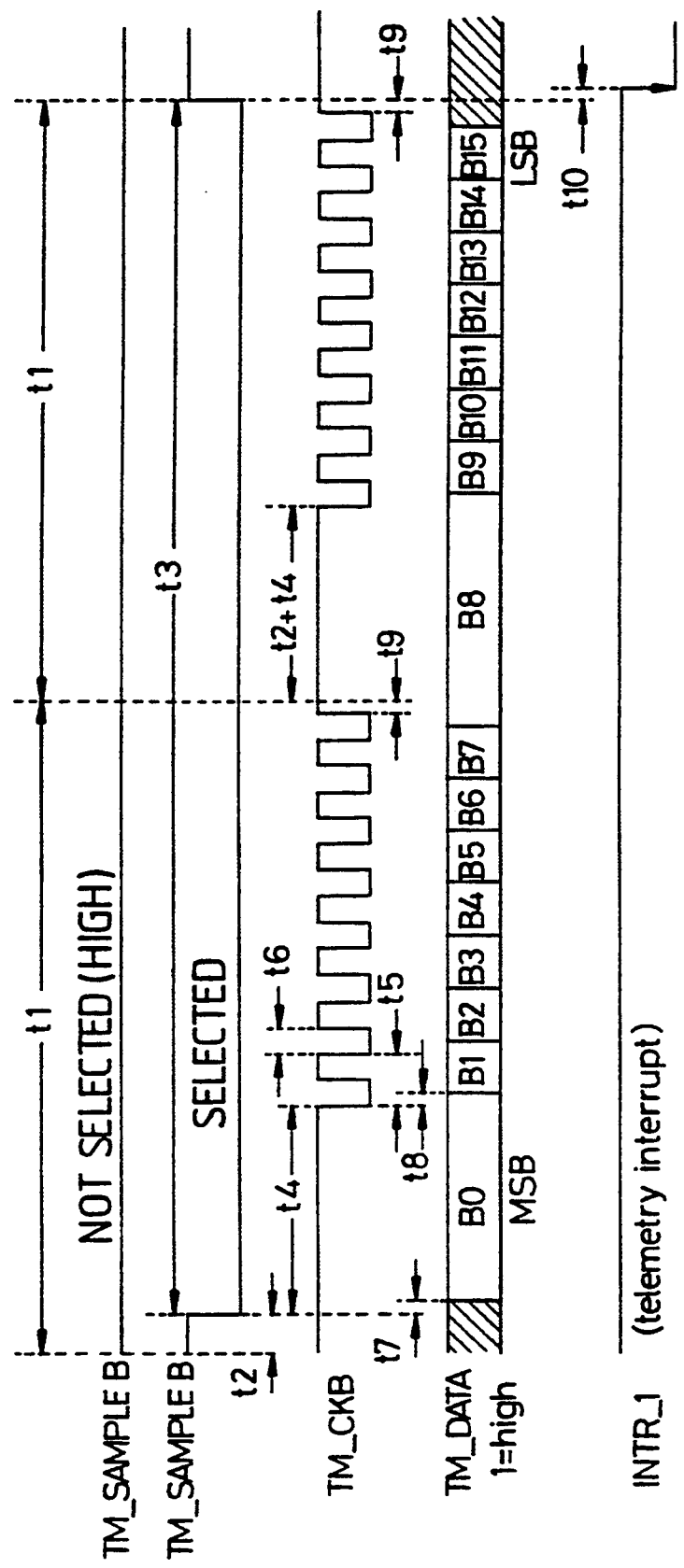
Figure 8E:
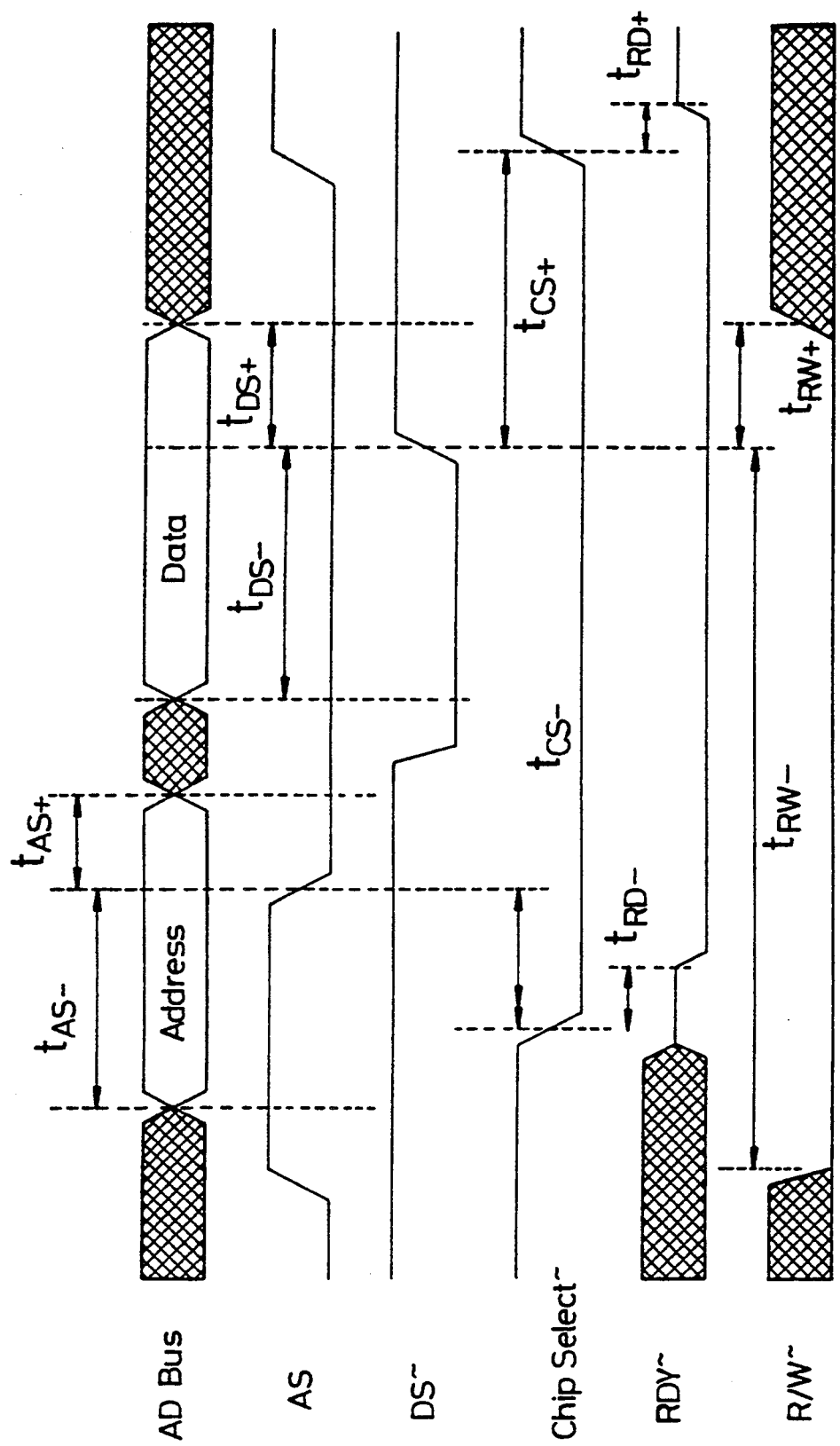
Figure 8F:
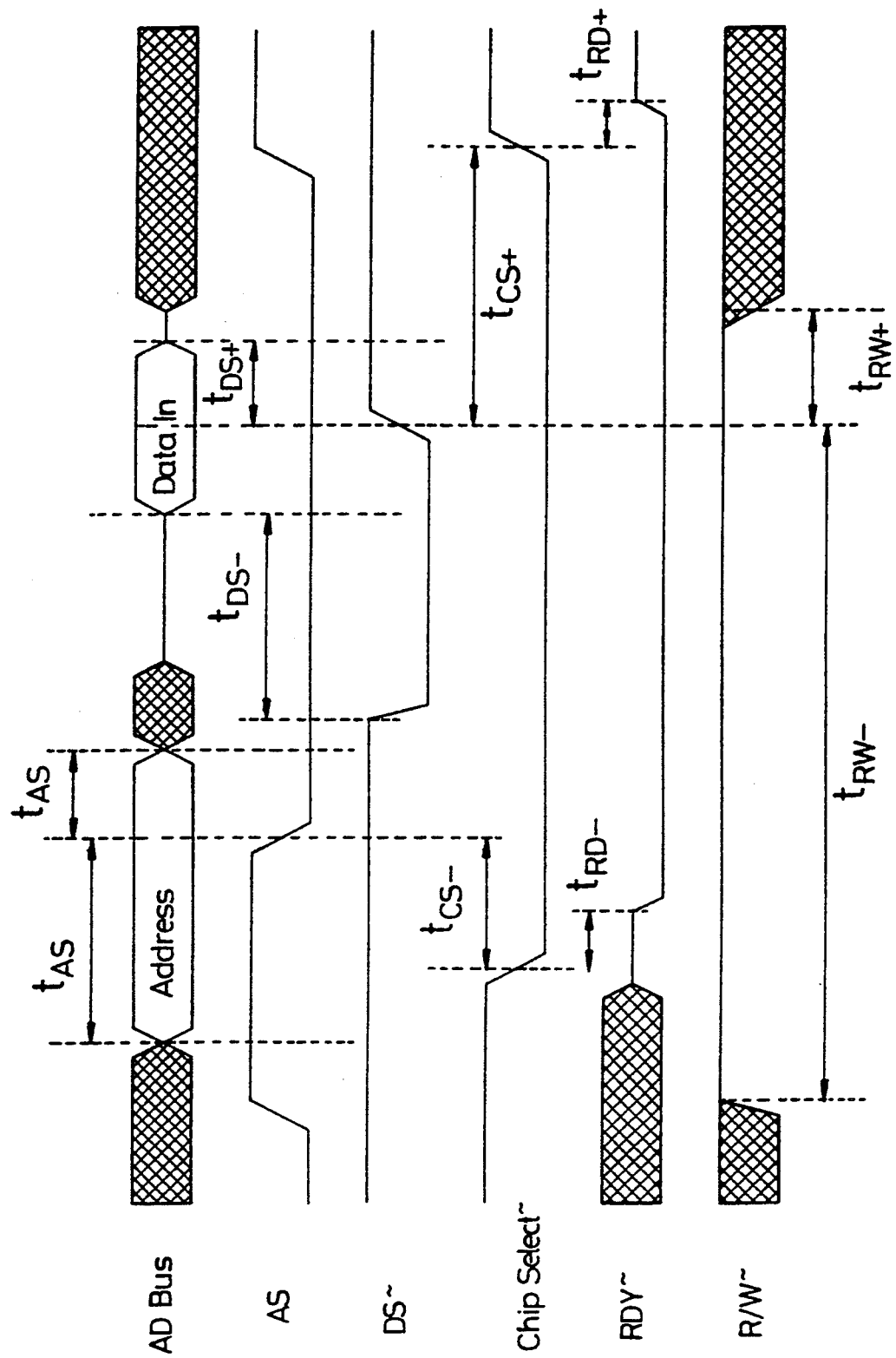

FIG. 5 shows operation in the microprocessor mode. In the microprocessor mode, the ASIC device provides all the signals necessary to interface between a MIL-STD-1750A microprocessor and a duplex serial interface consisting of one AS16 telemetry and one CS16 telecommand channel as defined in ESA Document TTC-B-01 Issue 1.

Normally, during software initialisation, the microprocessor would clear any residual Interrupts and the TM/TC complete status and enable interrupts. This would be accomplished using the control port (if using a polling method then the interrupts would not be enabled).

Whenever a serial command is received, then at the end of the STROBE the telecommand complete flag and, if enabled, the telecommand interrupt line will be set. The software would then respond by reading the data from the data port. This reading by the software will then reset the telecommand complete flag and will clear the interrupt.

Similarly, whenever serial telemetry is requested, then at the end of the SAMPLE the telemetry complete flag and, if enabled, the telemetry interrupt line will be set. The software would then respond by writing new data to the data port. This writing by the software will then reset the telemetry complete flag and will clear the interrupt. Since no software action will occur until the flag or interrupt is set then it may be necessary also to set a default telemetry word in the data register during initialisation. If not set then this data will be 0000 hex. on power up.

Telemetry data can be repetitively read without corruption from the serial port, as can telecommand data be repetitively read without corruption by the processor. In addition, telecommand data can be overwritten at any time by the serial telecommand channel and telemetry data can be overwritten at any time by the processor. If the processor writes to the telemetry whilst it is transmitting, then this data will be latched for the next telemetry request and will not affect the current transmission.

The microprocessor memory map is shown in FIG. 6. The control/status and data addresses of the chip are set jointly by the chip select input being asserted low, and Address bit 15 (LSB) input as the address part of the multiplexed Address/Data bit 15 (AD15). It will be noted that the decode of address bits 0–14 are external to the chip.

The bit assignation of the control, status and data ports are shown in FIGS. 7a–d and the timing diagrams are shown in FIGS. 8a–f.

Returning to FIG. 5, in the microprocessor mode, memory load command data is clocked into a 32 bit SIPO 16 which functions as a 16 bit SIPO. Data is then presented at a 16 bit latch 48 where it passes via a 16 bit buffer 50 to the microprocessor interface 52. In the other direction, data passes from the interface 52 to a 16 bit latch 54 then via a buffer 56 to the PISO converter 18 and then transmitted via the telemetry port.

BYPASS MODE

Figure 9:
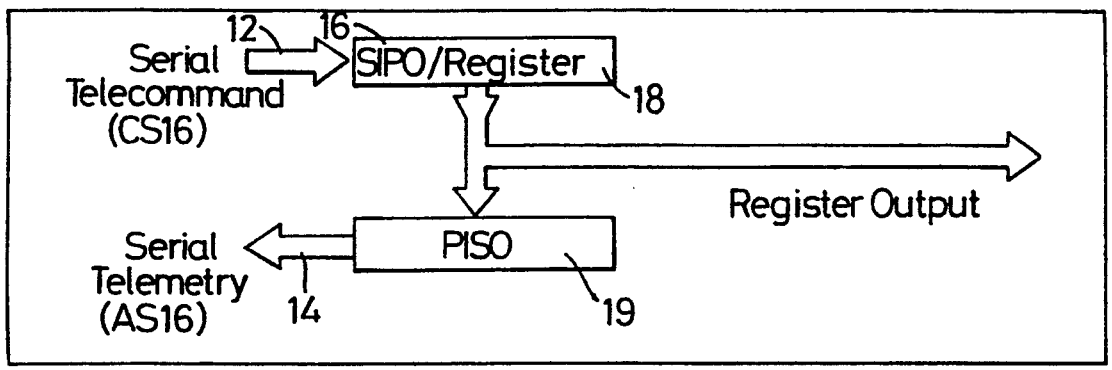
FIG. 9 is a simplified block diagram representing the multifunctional ASIC device when operating in the bypass mode.

In the bypass mode, the configuration pin input status is adjusted and the pins have the input and output functions as shown in the appendix. Referring to FIG. 9, in the bypass mode, the chip provides a simple reflected serial command and telemetry hardware channel with a latched 16 bit register output. The chip provides an interface to a 16 bit latch from a serial CS16 telecommand channel. The latch is readable from a serial AS16 telemetry channel. All timing of the telecommand-/telemetry data channel is identical to the microprocessor mode. The latch is initially set to all zeroes on power up and is then updated at the end of each signal data strobe, remaining unchanged at all other times including during serial data transmission.

Serial telecommand data passes via a SIPO converter 16 to a register 18 for being presented either to the register output or back to a PISO converter 18 for return as telemetry data.

Figure 10:
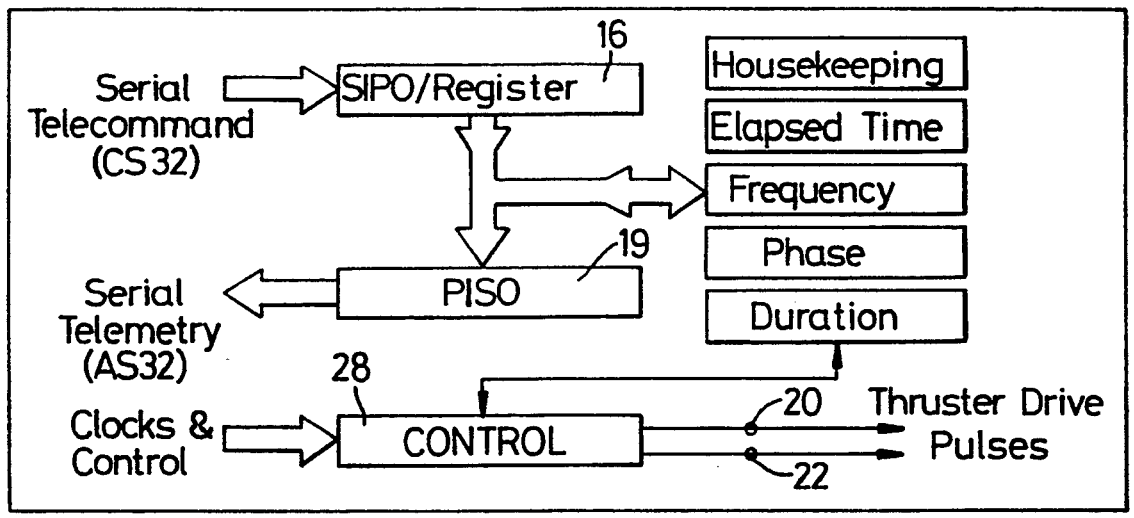
FIGS. 10 and 11 are simplified block diagrams of the ASIC while operating in the Thruster Drive Mode and the microprocessor mode, for comparison with FIG. 9.
Figure 11:
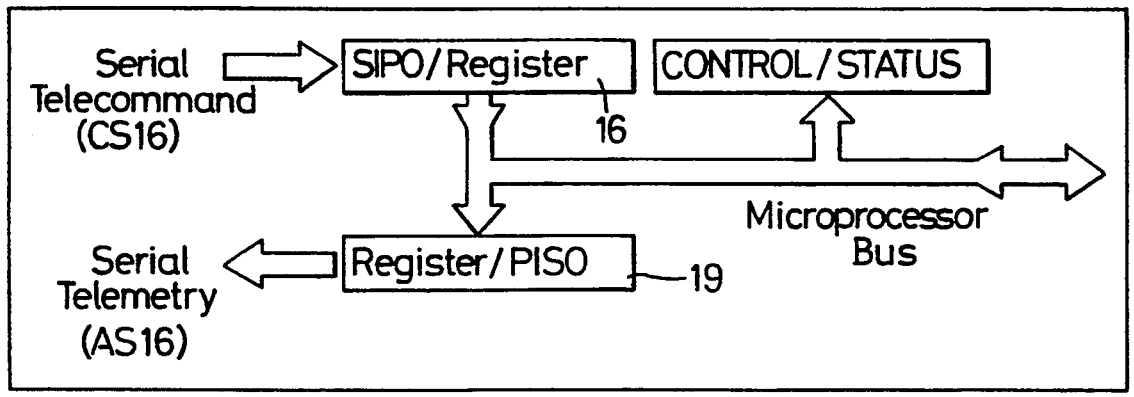

FIGS. 10 and 11 are simplified block diagrams showing the ASIC 10 in Thruster Drive Mode and Bypass Mode respectively to illustrate the commonality of the circuitry shared between the three different modes. The commonality of function is also apparent from the dotted lines in FIG. 5 which show where the circuit elements specific to the thruster drive mode interface with the PISO converter 19, SIPO converter 16 and the register/latch 14/48, and again from a study of the pin listings in the appendix to see where the pins are used for the same or analogous functions.

It will be appreciated from the appendix that the pins of the ASIC 10 serve different functions according to the operating mode of the ASIC, thus reducing the number of pins required on the ASIC.

APPENDIX 1/3
Configuration Table
This table defines the configuration pin input status required to set the different functional modes.

|  | Pin 61 | Pin 62 | Pin 66 | Pins 50, 57, 58, | Pins 42, 51, 53, 67 | Pin 39 | Pin 40 | Pin 47 | Pin 63 | Pin 49 |
|---|---|---|---|---|---|---|---|---|---|---|
| Thruster Drive Mode | 0 | 0 | x | x | x | x | x | x | 0 | x |
| Microprocessor Mode | 0 | 1 | 0 | 1 | 0 | x | x | x | 0 | x |
| Bypass Mode | 0 | 1 | 1 | 1 | 0 | 0 | 1 | 0 | 0 | 0 |
| Test Mode | 1 | x | x | x | x | x | x | x | x | x |
| (note this is reserved for factory testing purposes) | | | | | | | | | | |

(note; an x in this table denotes a used dynamic input, not a don't care condition. Its function is detailed in the more comprehensive pin listing below.)

Pin Listing

APPENDIX 2/3

| Pin No. | Mnemonic | Thruster Drive Mode Description | IO | Microprocessor Mode Mnemonic | Microprocessor Mode Description | IO | Bypass Mode Mnemonic | Bypass Mode Description | IO |
|---|---|---|---|---|---|---|---|---|---|
| 1 | Vss | Ground | I | Vss | Ground | I | Vss | Ground | I |
| 2 | APBX_4 | Block X Address patch | I | INTR_2 | Interrupt 2, (Telecommand) | I | NU | not used | O |
| 3 | APBX_5 | Block X Address patch (LSB) | I | AD_0 | Address Data Bus 0 (MSB) | IO | D0 | Data bit 0 (MSB) | IO |
| 4 | APBY_1 | Block Y Address patch (MSB) | I | AD_1 | Address Data Bus 1 | IO | D1 | Data bit 1 | IO |
| 5 | APBY_2 | Block Y Address patch | I | AD_2 | Address Data Bus 2 | IO | D2 | Data bit 2 | IO |
| 6 | APBY_3 | Block Y Address patch | I | AD_3 | Address Data Bus 3 | IO | D3 | Data bit 3 | IO |
| 7 | APBY_4 | Block Y Address patch | I | AD_4 | Address Data Bus 4 | IO | D4 | Data bit 4 | IO |
| 8 | APBY_5 | Block Y Address patch (LSB) | I | AD_5 | Address Data Bus 5 | IO | D5 | Data bit 5 | IO |
| 9 | Vdd | +5v | I | Vdd | +5v | I | Vdd | +5v | I |
| 10 | L_6_OUT | Block Y Telecommand discrete output | O | NU | not used | O | NU | not used | O |
| 11 | HK_6_IN | Block Y Housekeeping Telemetry input | I | AD_6 | Address Data Bus 6 | IO | D6 | Data bit 6 | IO |
| 12 | L_7_OUT | Block Y Telecommand discrete output | O | NU | not used | O | NU | not used | O |
| 13 | HK_7_IN | Block Y Housekeeping Telemetry input | I | AD_7 | Address Data Bus 7 | IO | D7 | Data bit 7 | IO |
| 14 | L_8_OUT | Block Y Telecommand discrete output | O | NU | not used | O | NU | not used | O |
| 15 | HK_8_IN | Block Y Housekeeping Telemetry input | I | AD_8 | Address Data Bus 8 | IO | D8 | Data bit 8 | IO |
| 16 | L_9_OUT | Block Y Telecommand discrete output | O | NU | not used | O | NU | not used | O |
| 17 | HK_9_IN | Block Y Housekeeping Telemetry input | I | AD_9 | Address Data Bus 9 | IO | D9 | Data bit 9 | IO |
| 18 | Vss | Ground | I | Vss | Ground | I | Vss | Ground | I |
| 19 | L_10_OUT | Block Y Telecommand discrete output | O | NU | not used | O | NU | not used | O |
| 20 | HK_10_IN | Block Y Housekeeping Telemetry input | I | AD_10 | Address Data Bus 10 | IO | D10 | Data bit 10 | IO |
| 21 | L_11_OUT | Block Y Telecommand discrete output | O | NU | not used | O | NU | not used | O |
| 22 | HK_11_IN | Block Y Housekeeping Telemetry input | I | AD_11 | Address Data Bus 11 | IO | D11 | Data bit 11 | O |
| 23 | L_12_OUT | Block Y Telecommand discrete output | O | NU | not used | O | NU | not used | |
| 24 | HK_12_IN | Block Y Housekeeping Telemetry input | I | AD_12 | Address Data Bus 12 | IO | D12 | Data bit 12 | O |
| 25 | L_13_OUT | Block Y Telecommand discrete output | O | NU | not used | O | NU | not used | O |
| 26 | HK_13_IN | Block Y Housekeeping Telemetry input | I | AD_13 | Address Data Bus 13 | IO | D13 | Data bit 13 | O |
| 27 | L_14_OUT | Block Y Telecommand discrete output | O | NU | not used | O | NU | not used | O |

-continued
Pin Listing

| Pin No. | Thruster Drive Mode Mnemonic | Description | IO | Microprocessor Mode Mnemonic | Description | IO | Bypass Mode Mnemonic | Description | IO |
|---|---|---|---|---|---|---|---|---|---|
| 28 | HK_14_IN | Block Y Housekeeping Telemetry input | I | AD_14 | Address Data Bus 14 | IO | D14 | Data bit 14 | IO |
| 29 | L_15_OUT | Block Y Telecommand discrete output | O | NU | not used | O | NU | not used | O |
| 30 | HK_15_IN | Block Y Housekeeping Telemetry input | I | AD_15 | Address Data Bus 15 (LBS) | IO | D_15D15 | Data bit 15 (LSB) | IO |
| 31 | Vdd | +5v | I | Vdd | +5v | I | Vdd | +5v | I |
| 32 | TM_DATA_Y_OUT_A | Block Y Telemetry data serial data output | TS O | NU | not used | O | NU | not used | O |
| 33 | TM_DATA_Y_OUT | Block Y Telemetry data serial data output (copy) | TS O | NU | not used | O | NU | not used | O |
| 34 | TM_DATA_X_OUT | Block X Telemetry data serial data output | TS O | TM_DATA _OUT | AS16 Telemetry data output | TS O | TM_DATA _OUT | AS16 Telemetry data output | TS O |
|  |  | APPENDIX 3/3 |  |  |  |  |  |  |  |
| 35 | TM_DATA_X_OUT_A | Block X Telemetry data serial data output (copy) | TS O | TM_DATA _OUT_A | AS16 Telemetry data output (copy) | TS O | TM_DATA _OUT_A | AS16 Telemetry data output (copy) | TS O |
| 36 | Vss | Ground | I | Vss | Ground | I | Vss | Ground | I |
| 37 | M_29_OUT | Block X TC, Bit 29 | O | M_29_OUT | not used output | O | M_29_OUT | connect to M_29_IN | O |
| 38 | M_29_IN | Block X TM, Bit 29 I/P | I | M_29_IN | input, connect to 0 | I | M_29_IN | connect to M_29_OUT | I |
| 39 | TM_STROBE_Y | Block Y Telemetry Strobe | I | DSB | Data Strobe | I | NU | set to 0v | I |
| 40 | TM_SAMPLE_YB | Block Y Telemetry Sample | I | RD_WRB | Read/Write | I | NU | set to +5v | I |
| 41 | TM_SAMPLE_XB | Block X Telemetry Sample | I | TM _SAMPLEB | Telemetry Sample | I | TM _SAMPLEB | Telemetry Sample | I |
| 42 | TM_STROBE_X | Block X Telemetry Strobe | I | NU | connect to 0v | I | NU | set to 0v | I |
| 43 | TM_CKB | Telemetry Clock | I | TM_CKB | Telemetry Clock | I | TM_CKB | Telemetry Clock | I |
| 44 | ML_CKB | Memory Load Clock | I | ML_CKB | Memory Load Clock | I | ML_CKB | Memory Load Clock | I |
| 45 | ML_STROBEB | Memory Load Strobe | I | ML_STROBEB | Memory Load Strobe | I | ML_STROBE | Memory Load Strobe | I |
| 46 | ML_DATA | Memory Load Data | I | ML_DATA | Memory Load Data | I | ML_DATA | Memory Load Data | I |
| 47 | SSC | Spin Segment Clock | I | SELECTB | Address Chip Select | I | NU | set to +0v | O |
| 48 | SRP | Spin Reference Pulse | I | RDYB | Ready | O | NU | not used | I |
| 49 | CLOCK_131K | 131 kHz clock | I | AS | Address Strobe | I | NU | set to 0v | I |
| 50 | CLOCK_1HZ | 1 Hz clock | I | NU | set to +5v | I | NU | set to +5v | I |
| 51 | EXECUTE | Enable execution of thruster drive function following next sun reference pulse | I | NU | set to 0v | I | NU | set to 0v | I |
| 52 | Vdd | +5v | I | Vdd | +5v | I | Vdd | +5v | I |
| 53 | MAN_ACT_IN | Block Y Housekeeping Telemetry input (Manoeuvre active) | I | NU | set to 0v | I | NU | set to 0v | I |
| 54 | MAN_ACT_OUT | Manoeuvre active output (= TC Block X bit 30.bit31 = selectA and SelectB) | O | NU | no connection | O | NU | not used | O |
| 55 | L_31_OUT | Block Y Telecommand discrete output | O | NU | no connection | O | NU | not used | O |
| 56 | LOAD_DET_OUTB | Telecommand Detected correct address | O | NU | no connection | O | NU | not used | O |

-continued

Pin Listing

| Pin No. | Mnemonic | Thruster Drive Mode Description | IO | Mnemonic | Microprocessor Mode Description | IO | Mnemonic | Bypass Mode Description | IO |
|---|---|---|---|---|---|---|---|---|---|
| 57 | DISABLE_2B | Disable Thruster Drive function | I | NU | set to 5v | I | NU | set to +5v | I |
| 58 | DISABLE_1B | Disable Thruster Drive function (either A or B will disable it) | I | NU | set to +5v | I | NU | set to +5v | I |
| 59 | PO_RESETB | Power On Reset | I | PO_RESETB | Power On Reset | I | PO_RESETB | Power On Reset | I |
| 60 | TD_OUT | Test Data Out, not used | O | TD_OUT | Test Data Out, not used | O | TD_OUT | Test Data out, not used | O |
| 61 | TM_SEL | Test Mode Select, set to 0v | I | TM_SEL | Test Mode Select, set to 0v | I | TM_SEL | Test Mode Select, set to 0v | I |
| 62 | TD_MODEB (TD_IN) | Test Data In, TD configuration, set to 0v | I | UP_MODE (TD_IN) | Test Data In, uP configuration, set to +5v | I | UP MODE (TD_IN) | Test Data In, Bypass mode, set. to +5v | I |
| 63 | NU (T_CK_IN) | Test Clock, not used, set to 0v | I | NU | set to 0v | I | NU | Not used, SET TO 0v | I |
| 64 | DRIVE_B | Thruster Drive B | O | NU | Not used | O | NU | Not used | O |
| 65 | DRIVE_A | Thruster Drive A | O | NU | Not used | O | NU | Not used | O |
| 66 | APBX_1 | Block X Address patch (MSB) | I | BYPASS | Enables Microprocessor function if "0", set to 0v | I | BYPASS | Enables Bypass mode, set to +5v | I |
| 67 | APBX_2 | Block X Address patch | I | NU | Not used, set to 0v | I | NU | Not used, set to 0v | I |
| 68 | APBX_3 | Block X Address patch | I | INTR_1 | Interrupt 1, (Telemetry) | I | NU | Not used | O |

We claim:

1. A multi-function application specific integrated circuit for a spin-stabilized spacecraft whose position and/or orientation is controlled in use by thruster means on board the spacecraft, said integrated circuit being operable for passing serial data between said spacecraft and a remote command station, said integrated circuit including:
   command data input means for receiving from said command station serial command data encoding thruster control signals;
   serial to parallel converter means for receiving from said data input means said serial data and converting it to parallel format;
   command store means for storing parallel data output by said serial to parallel converter means;
   thruster control means for receiving from said command store means parallel data and for extracting therefrom thruster control signals;
   telemetry data input means for receiving parallel telemetry data;
   telemetry store means for storing said parallel telemetry data;
   parallel to serial converter means for receiving parallel telemetry data from said telemetry store means and converting it into serial format;
   telemetry data output means for receiving serial data from said parallel to serial converter means and passing it for output to said remote station;
   mode selecting means for selecting the operating mode of said integrated circuit; and
   microprocessor parallel interface means for receiving data from said command store means, and transmitting data to said telemetry store means, wherein in a microprocessor mode data supplied to said command data input means is passed to said microprocessor interface means and data from said interface means is passed to said telemetry data output means.

2. A multi-function application specific integrated circuit according to claim 1, including bypass means operable to pass data stored in said command store means to said telemetry data input means, wherein the integrated circuit provides a reflected serial command and telemetry channel, and means for setting said mode selecting means to select a bypass mode in which said bypass means is rendered operable.

3. A multi-function application specific integrated circuit according to claim 1, including a plurality of input and output terminal means for passing data to or from said command data input means and said telemetry data output means, wherein said mode selection means is responsive to application of predetermined signals to selected ones of said terminal means.

4. A control assembly for a spin stabilized spacecraft whose position and/or orientation is controlled in use by thruster means on board the spacecraft, said control assembly being operable for passing serial data between said spacecraft and a remote command station, said control assembly comprising a plurality of integrated circuits, each integrated circuit including:
   command data input means for receiving from said command station serial command data encoding thruster control signals;
   serial to parallel converter means for receiving from said data input means said serial data and converting it to parallel format;
   command store means for storing parallel data output by said serial to parallel converter means;
   thruster control means for receiving from said store means parallel data and for extracting therefrom thruster control signals;
   telemetry data input means for receiving parallel telemetry data;
   telemetry store means for storing said parallel telemetry data;
   parallel to serial converter means for receiving parallel data from said telemetry store means and converting it into serial format;
   telemetry data output means for receiving serial data from said parallel to serial converter means and passing it for output to said remote station;
   mode selecting means for selecting the operating mode of said integrated circuit; and
   microprocessor parallel interface means for receiving data from said command store means and transmitting data to said telemetry store means wherein in a microprocessor mode data supplied to said command data input means is passed to said microprocessor interface means and data from said interface means is passed to said telemetry data output means.

* * * * *